US011032417B2

(12) United States Patent
Tatourian et al.

(10) Patent No.: US 11,032,417 B2
(45) Date of Patent: *Jun. 8, 2021

(54) COLLABORATIVE PHONE REPUTATION SYSTEM

(71) Applicant: Intel Corporation, Santa Clara, CA (US)

(72) Inventors: Igor Tatourian, Fountain Hills, AZ (US); Rita H Wouhaybi, Portland, OR (US); Hong Li, El Dorado Hills, CA (US); Tobias Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,482

(22) Filed: May 29, 2020

(65) Prior Publication Data

US 2020/0412870 A1    Dec. 31, 2020

Related U.S. Application Data

(63) Continuation of application No. 15/910,362, filed on Mar. 2, 2018, now Pat. No. 10,715,659, which is a
(Continued)

(51) Int. Cl.
*H04M 3/436* (2006.01)
*H04M 3/42* (2006.01)
(Continued)

(52) U.S. Cl.
CPC ............. *H04M 3/436* (2013.01); *H04M 1/66* (2013.01); *H04M 3/42042* (2013.01);
(Continued)

(58) Field of Classification Search
CPC ........ H04M 3/436; H04M 3/42; H04M 19/04; H04M 1/66; H04M 19/42042;
(Continued)

(56) References Cited

U.S. PATENT DOCUMENTS 7,454,008 B1    11/2008 Hayes et al.
8,116,727 B1    2/2012 Kates et al.
(Continued)

FOREIGN PATENT DOCUMENTS

CN        1691039       11/2005
CN       104052880      9/2014
(Continued)

OTHER PUBLICATIONS

Communication and invitation pursuant to 69 and 70a(1)EPC, dated Mar. 12, 2018 in European Patent Application No. 17020462.2.
(Continued)

*Primary Examiner* — Meless N Zewdu
(74) *Attorney, Agent, or Firm* — Green, Howard & Mughal LLP.; Christopher K. Gagne

(57) ABSTRACT

Various systems and methods for a collaborative phone reputation system are described herein. A system for implementing a collaborative phone reputation system includes a compute device comprising: a call handling module to detect, at the compute device, an incoming call for a user of the compute device; a scoring module to determine a local probabilistic score that the incoming call is desirable for the user; and an execution module to perform an action at the compute device based on the local probabilistic score.

20 Claims, 4 Drawing Sheets

Related U.S. Application Data continuation of application No. 15/250,019, filed on Aug. 29, 2016, now Pat. No. 10,044,855, which is a continuation of application No. 14/581,446, filed on Dec. 23, 2014, now Pat. No. 9,432,506.

(51) Int. Cl.

| | | |
|---|---|---|
| *H04W 4/16* | (2009.01) | |
| *H04W 4/12* | (2009.01) | |
| *H04M 19/04* | (2006.01) | |
| *H04M 1/66* | (2006.01) | |
| *H04W 12/00* | (2021.01) | |

(52) U.S. Cl.
CPC ....... *H04M 3/42059* (2013.01); *H04M 19/04* (2013.01); *H04W 4/12* (2013.01); *H04W 4/16* (2013.01); *H04W 12/00* (2013.01); *H04M 3/4365* (2013.01); *H04M 2203/551* (2013.01); *H04M 2203/556* (2013.01); *H04M 2250/60* (2013.01)

(58) Field of Classification Search
CPC ......... H04M 19/42059; H04M 3/4365; H04M 2250/60; H04M 2503/556; H04M 3/42059; H04M 2203/551; H04M 3/2281; H04M 7/0078; H04M 2215/0148; H04M 3/42034; H04M 3/42042; H04M 1/663; H04M 1/667; H04M 3/42357; H04M 3/42374; H04W 4/16; H04W 12/00; H04W 4/12; H04W 12/002; H04W 12/0051; H04W 12/00514; H04W 12/0802; H04W 12/12; H04W 4/60; H04W 12/10; H04W 92/00; H04W 92/08; H04W 92/10; H04W 88/00; H04W 88/02; H04W 88/08; H04W 68/00; H04W 68/005; H04W 12/30; H04W 12/108; H04W 4/50; H04L 29/0687; H04L 29/06877; H04L 63/12; H04L 63/126; H04L 29/0634; H04L 29/06346; H04L 29/06857; H04L 51/24; H04L 63/14

See application file for complete search history.

(56) References Cited

U.S. PATENT DOCUMENTS

| | | | |
|---|---|---|---|
| 8,379,816 | B1 | 2/2013 | Lu et al. |
| 8,565,396 | B1 | 10/2013 | Oliver |
| 8,577,002 | B2 | 11/2013 | Stein et al. |
| 8,781,093 | B1 | 7/2014 | Rybak et al. |
| 9,002,333 | B1 | 4/2015 | Tong et al. |
| 9,014,359 | B1 | 4/2015 | Pfeffer et al. |
| 9,288,319 | B2 | 3/2016 | Foss |
| 9,432,506 | B2* | 8/2016 | Tatourian et al. .... H04M 3/426 |
| 9,648,163 | B2 | 5/2017 | Pfeffer et al. |
| 9,769,310 | B2 | 9/2017 | Hodge |
| 10,044,855 | B2* | 8/2018 | Tatourian et al. .... H04M 3/436 |
| 10,091,350 | B2 | 10/2018 | Hodge |
| 10,182,148 | B2 | 1/2019 | Winkler |
| 10,715,659 | B2* | 7/2020 | Tatourian et al. .... H04M 3/436 |
| 2001/0036258 | A1* | 11/2001 | Sugla ...................... 379/211.01 |
| 2003/0156707 | A1 | 8/2003 | Brown et al. |
| 2004/0264663 | A1 | 12/2004 | Enzmann et al. |
| 2005/0185784 | A1 | 8/2005 | Chiu et al. |
| 2006/0182029 | A1 | 8/2006 | Kealy et al. |
| 2006/0188081 | A1 | 8/2006 | Hooper et al. |
| 2007/0201660 | A1* | 8/2007 | Lan et al. ................ 379/201.01 |
| 2008/0077515 | A1 | 3/2008 | Zoldi et al. |
| 2008/0084975 | A1 | 4/2008 | Schwartz |
| 2008/0104664 | A1 | 5/2008 | Morin et al. |
| 2008/0159521 | A1 | 7/2008 | Sneyders et al. |
| 2008/0243920 | A1 | 10/2008 | Newman et al. |
| 2009/0136013 | A1 | 5/2009 | Kuykendall |
| 2011/0044431 | A1 | 2/2011 | Klemm |
| 2012/0066498 | A1* | 3/2012 | Engert .......................... 713/170 |
| 2012/0207285 | A1 | 8/2012 | Lawson |
| 2012/0246103 | A1 | 9/2012 | Mantripragada et al. |
| 2012/0294435 | A1 | 11/2012 | Cox et al. |
| 2013/0267280 | A1 | 10/2013 | Delco et al. |
| 2013/0268470 | A1 | 10/2013 | Yablokov et al. |
| 2013/0347108 | A1* | 12/2013 | Gabe .................. H04L 63/1408 |
| 2014/0096246 | A1* | 4/2014 | Morrissey et al. ............. 726/23 |
| 2014/0105373 | A1 | 4/2014 | Sharpe |
| 2014/0128047 | A1 | 5/2014 | Edwards |
| 2014/0280097 | A1 | 9/2014 | Lee et al. |
| 2014/0295802 | A1 | 10/2014 | Rybak et al. |
| 2014/0302828 | A1 | 10/2014 | Liu et al. |
| 2014/0341081 | A1 | 11/2014 | Efrati et al. |
| 2015/0087280 | A1 | 3/2015 | Farrand et al. |
| 2015/0189082 | A1* | 7/2015 | Pfeffer et al. ......... H04M 3/436 |
| 2015/0341903 | A1* | 11/2015 | Jeong et al. .......... H04W 68/02 |
| 2016/0007204 | A1* | 1/2016 | Park et al. ............ H04W 12/12 |
| 2016/0029188 | A1 | 1/2016 | Joels et al. |
| 2016/0094944 | A1 | 3/2016 | Kong et al. |
| 2016/0182716 | A1 | 6/2016 | Tatourian et al. |

FOREIGN PATENT DOCUMENTS

| | | | | |
|---|---|---|---|---|
| CN | 104159229 | | 11/2014 | |
| GB | 002389681 A | * | 12/2003 | ........ H04M 3/42153 |
| JP | 10-65837 | | 3/1998 | |
| JP | 2004-260354 | | 9/2004 | |
| JP | 2006350870 | | 12/2006 | |
| JP | 2008099213 | | 4/2008 | |
| JP | 2009290248 | | 12/2009 | |
| JP | 2010232729 | | 10/2010 | |
| JP | 2014504112 | | 2/2014 | |
| JP | 2014045454 | | 3/2014 | |
| JP | 2014129067 | | 7/2014 | |
| WO | 2012111489 | | 8/2012 | |

OTHER PUBLICATIONS

Decision to Grant a Patent for Japanese Patent Application No. 2017-204974, dated Apr. 7, 2020.
Decision to Refuse for Japanese Patent Application No. 2017-528828, dated Jul. 23, 2019.
English translation of Office Action for Chinese Patent Application No. 201580063496X, dated Aug. 30, 2019.
English Translation of Office Action for Chinese Patent Application No. 201811010744.6, dated Nov. 4, 2020.
Extended European Search Report for European Patent Application No. 15874076.1, dated Jun. 19, 2018.
Extended European Search Report for European Patent Application No. 17020462.2, dated Nov. 20, 2017.
International Preliminary Report on Patentability for PCT Application No. PCT/US2015/063412, dated Jul. 6, 2017.
International Search Report and Written Opinion for PCT Application No. PCT/US2015/063412, dated Feb. 26, 2016.
List-Unsubscribe postings dated Aug. 31, 2006 et seq., http://list-unsubscribe.com.
Notice of Allowance for U.S. Appl. No. 14/581,446, dated Apr. 26, 2016.
Notice of Allowance for U.S. Appl. No. 15/250,019, dated Apr. 10, 2018.
Notice of Allowance for U.S. Appl. No. 15/250,019, dated Dec. 7, 2017.
Notice of Allowance for U.S. Appl. No. 15/910,362, dated Mar. 3, 2020.
Notification of European Publication dated Feb. 7, 2018 in European Patent Application No. 17020462.2.
Office Action for Chinese Patent Application No. 201580063496.X, dated May 13, 2020.
Office Action for Chinese Patent Application No. 201811010744.6, dated Mar. 3, 2020.
Office Action for European Patent Application No. 17020462.2, dated Dec. 15, 2020.

(56) References Cited

OTHER PUBLICATIONS

Office Action for European Patent Application No. 17874076.1, dated Dec. 3, 2020.
Office Action for Japanese Patent Application No. 2017-204974, dated Dec. 5, 2019.
Office Action for Japanese Patent Application No. 2017-204974, dated Jul. 23, 2019.
Office Action for Japanese Patent Application No. 2017-204974, dated Nov. 6, 2018.
Office Action for Japanese Patent Application No. 2017-528828, dated Nov. 6, 2018.
Office Action for Japanese Patent Application No. 2018-165794, dated Aug. 9, 2019.
Office Action for Japanese Patent Application No. 2018-165794, dated Dec. 3, 2019.
Office Action for U.S. Appl. No. 14/581,446, dated Nov. 20, 2015.
Office Action for U.S. Appl. No. 15/250,019, dated Jun. 16, 2017.
Office Action for U.S. Appl. No. 15/250,019, dated Oct. 5, 2017.
Office Action for U.S. Appl. No. 15/910,362, dated Aug. 6, 2019.
Office Action for U.S. Appl. No. 15/910,362, dated Dec. 20, 2019.
Preliminary Amendment filed in U.S. Appl. No. 15/250,019 dated Dec. 9, 2016.
Response to Office Action dated Nov. 20, 2015 for U.S. Appl. No. 14/581,446, filed Jan. 18, 2016.
Search Report for Chinese Patent Application No. 201580063496X, dated Aug. 22, 2019.
Search Report for Japanese Patent Application No. 2018-165794, dated Aug. 8, 2019.
Supplementary European Search Report for European Patent Application No. 15874076.1, dated Jun. 19, 2018.
English Translation of Office Action for Chinese Patent Application No. 201580063496.X, dated Feb. 3, 2021.

\* cited by examiner

COLLABORATIVE PHONE REPUTATION SYSTEM

PRIORITY APPLICATION

This application is a continuation of U.S. application Ser. No. 14/581,446, filed Dec. 23, 2014, which is incorporated herein by reference in its entirety.

TECHNICAL FIELD

Embodiments described herein generally relate to mobile device management and in particular, to a collaborative phone reputation system.

BACKGROUND

Telemarketers, surveyors, and other unsolicited people may attempt to contact a person via phone. In 2003, the Federal Trade Commission created the Do Not Call Registry. People could add their own phone numbers to the Registry. Telemarketers were required to reference the Registry and put phone numbers from the Registry on their "do not call" lists. However, even with the Registry in place, unsolicited calls continue to be a problem. As an example, the Registry may restrain telemarketers, but does not address social engineering attacks by criminals trying to trick end-users into giving away personal and financial information.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a collaborative phone reputation system. Using the collaborative phone reputation system, a user may avoid having to receive calls from callers who have a poor reputation.

In the ten or more years after the FTC Do No Call Registry was established, unsolicited calls continue to be a problem for many people. Some of the problems stem from telemarketing firms that do not abide by the Registry. Other problems stem from the organizations and parties not covered by the Registry, such as charities, political organizations, surveyors, and companies that had an existing relationship with the receiving party. But the biggest threat and challenge comes from criminals conducting social engineering attacks. The problem is exacerbated by the prevalence of mobile phones and the resulting situation where people have a phone on or near them at nearly every hour of the day.

Some mobile applications and services have attempted to address the problem of unsolicited phone calls by using blacklists. A blacklist is a list of phone numbers that are suspected to be undesirable, such as telemarketers, fraudulent solicitations, scammers, or robodialers. However, many blacklist services require manual configuration and ongoing maintenance. In addition, blacklist services are a simplistic mechanism where either a number is on or not on the list, and if it is on the list, the number is blocked or flagged. What is needed a more dynamic workable solution for tracking undesirable numbers.

Figure 1:
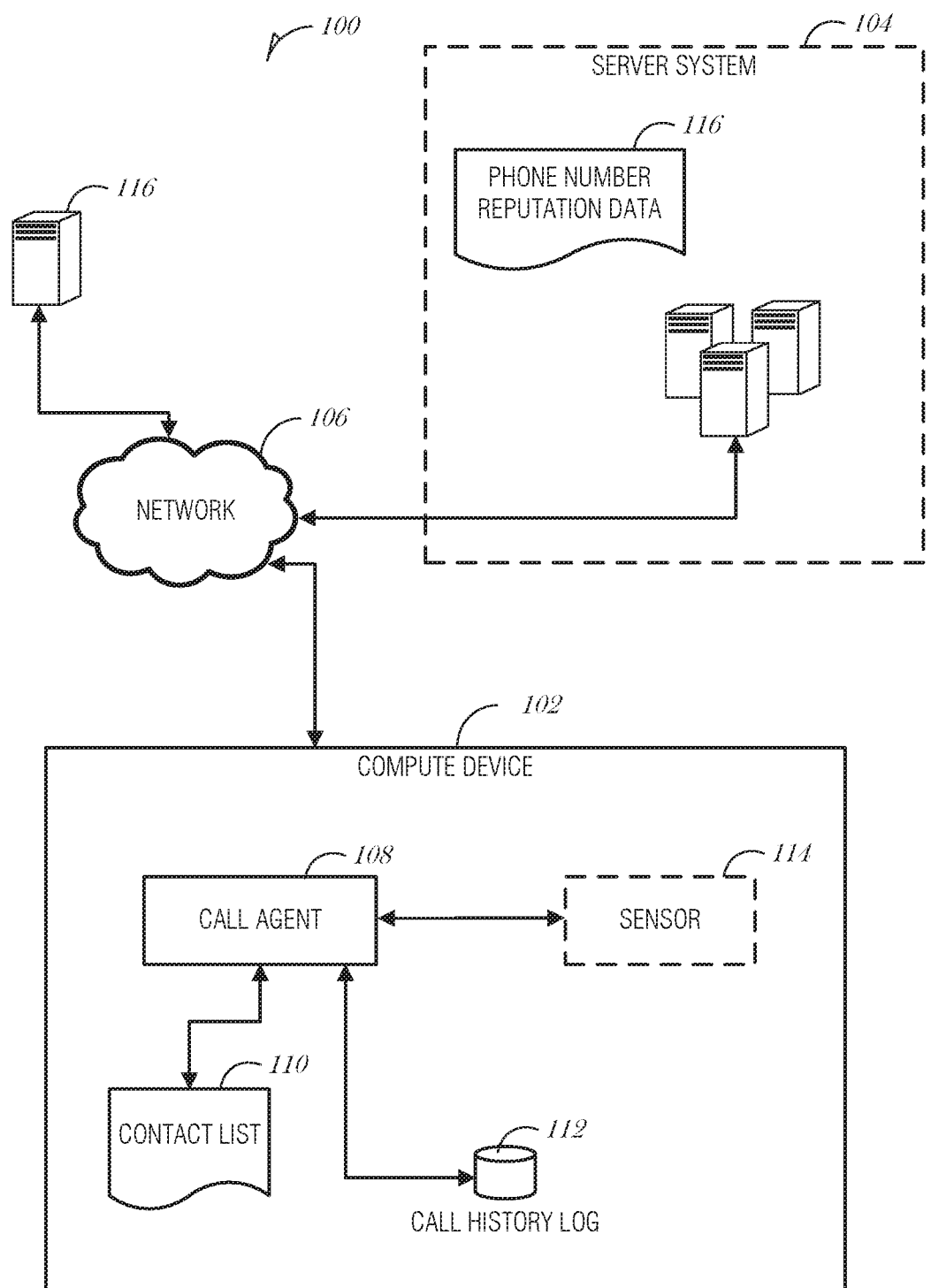
FIG. 1 is a schematic drawing illustrating a system, according to an embodiment.

FIG. 1 is a schematic drawing illustrating a system 100, according to an embodiment. The system 100 includes a compute device 102 and a server system 104, which are communicatively coupled via a network 106. The compute device 102 may be a device such as a smartphone, cellular telephone, mobile phone, laptop computer, tablet computer, music player, wearable device (e.g., watch, glasses-based device, etc.), desktop, laptop, hybrid, in-wall, or other networked device. The compute device 102 includes a speaker and a non-audible alert mechanism. The non-audible alert mechanism may be a mechanical vibration motor or an electronic display. When in a normal mode, the compute device 102 may alert a user of an incoming call or notification using the audible alert mechanism (e.g., a ringtone), possibly with a non-audible alert (e.g., a vibration). When operating in silent mode, the compute device 102 may alert the user with a vibration or vibration pattern, a visual notification, or combinations of non-audible alerts.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices in FIG. 1 may be coupled to the network 106 via one or more wired or wireless connections.

The server system 104 may provide a collaborative phone reputation system. In addition, the server system 104 may provide auxiliary services, such as a social network platform, a retail shopping platform, a weather forecast or history, an appointment calendar, email, text messaging, instant messaging, voice over Internet Protocol (VOIP), or the like.

In use, the compute device 102 may receive an incoming phone call. The call agent 108 intercepts the incoming phone call and analyzes it using a variety of mechanisms in order to determine a probability that a phone call is undesirable. Some of the factors the call agent 108 may use are a relationship between the caller and recipient, a context of the recipient, relevant call history, and the phone number reputation score of the calling number. The call agent 108 may access a contact list 110 or a call history 112, to assess the caller's identity or the frequency of conversations with the caller. The call agent 108 may identify aspects of the caller or the phone number based on telephone company ("telco") switches. For example, a telco switch may be accessed to determine whether the caller is a commercial line or a residential line. The compute device 102 may allow calls that originate from residential lines and block calls that originate from commercial lines. Another feature that may be used is an automatic number identification feature of a telecommunications network.

While generally discussed in terms of phone calls, it is understood that the concepts may be applied more generally to any type of communication, such as be text messages or emails in addition to phone calls, if there is a way to map such messages to a phone number, e.g., via an address book or other online directories.

The call agent 108 may also access one more sensors 114. The sensor 114 may be remote from the compute device 102 or incorporated into the compute device 102. The sensor 114 may be paired with the compute device 102 using a short-range wireless network, such as Bluetooth®. The sensor 114 may be one of any type of sensor, including but not limited to, a camera, a posture sensor, a biometric sensor (e.g., heart rate, skin temperature, perspiration, etc.), location sensor (e.g., GPS or GLONASS), a microphone, an accelerometer, motion sensor, ambient light sensor, or the like. While only one sensor 114 is illustrated in FIG. 1, it is understood that more than one sensor 114 may be implemented and that some sensors may be incorporated into the compute device 102, while other sensors may be separate from the compute device 102. Using the sensor 114, the call agent 108 may detect a context or content of a conversation, ambient sounds, motion, or the like to indicate or infer a recipient's reaction or response to parts of the conversation.

The call agent 108 may also communicate with the server system 104 to obtain a reputation of the calling phone number. The server system 104 may maintain a reputation database having phone number reputation data 116 for a plurality of phone numbers. The phone number reputation data 116 includes a phone number and one or more reputation scores. The reputation scores are a reflection of how desirable it is to receive a call from the phone number. Mass-dialers, such as telemarketers or other robodialing systems, may have phone numbers with relatively low reputations. In contrast, individuals who only call their family members may have relatively high reputations. In an example, the reputation database includes phone number reputation data 116 for practically all known phone numbers in use. The reputation database may be regional, such as only for United States phone number, or international. The reputation database may be partitioned by country calling codes, area codes, or other regional phone number partitioning scheme.

After the call agent 108 analyzes an incoming, ongoing, or completed call, the call agent 108 may score the interaction and push that score to the server system 104. The server system 104 then uses the score to update the reputation of the phone number. If a phone number is being used by a telemarketer, then the phone number's reputation may decline rapidly. If later, the same phone number is assigned to a private party who uses it responsibly, the phone number may gain reputation. This mechanism may also work in the instance when the phone number was with one private party (e.g., a drug dealer) and then later assigned to another private party (e.g., a software engineer), who is able to restore the reputation associated with the phone number. In this way, the phone number is able to be dynamically restored to a reputable level.

The server system 104 may receive scores from a large number of clients (e.g., compute devices) to modify phone number reputations. In addition, the server system 104 may perform its own diligence on numbers, such as by performing reverse phone lookups to determine whether a number is associated with a business or individual, and perhaps whether the number is associated with a business known for mass-dialing (e.g., telemarketer). The server system 104 may also access another computer system 116, such as a consumer driven website where people report those who abuse or ignore the FTC Registry. The server system 104 may also access another computer system 116, such as a social media site, to identify reports of various scams or social engineering attempts and determine signatures of phone callers from those reports. Using the direct report information and other derived information, the server system 104 may update one more phone numbers' reputation data.

Thus, the compute device 102 may receive calls, assess the desirability of the call, compute and assign a score to the caller, and report the score to the server system 104, which may then update its records of reputation data. When the compute device 102 receives a call, it may obtain the reputation from the server system 104. This is especially useful when the call is from an unknown number. The compute device 102 may also assess how the user reacted to previous instances of receiving calls from unknown numbers (e.g., did the user pick up, send to voicemail, or disconnect?).

The call agent 108 may also screen calls using a recorded greeting. The recorded greeting may be a recording of the user's voice or may be a computer-generated greeting with a simulated or pre-recorded human voice. The call agent 108 may answer the call and play the greeting. This is sometimes necessary to provoke a response because some robodialers may remain silent until the recipient talks, and then the robodialer either opens a line to a human operator or begins a recorded message. When speech is heard in response to the greeting, the call agent 108 may analyze the call using various factors, such as is the caller a human or a recording, is the caller voice a recognized voice (e.g., someone the user has talked to before), or what keywords are used in the conversation. For example, keywords such as "limited time offer" or "valued customer" may indicate a sales call. Further, voice analysis may be used to determine the nationality of the caller. For example, calls with caller ID blocked and having a speaker with a foreign accent may be an indication of a scammer Voice analysis may also be used to determine whether the caller is human or not. The call agent 108 may look for a typical greeting, such as "Hello" and timing of further conversation. For example, a human will typically greet a person and then wait for a responsive greeting, whereas a computerize voice caller may not wait for a response from the call recipient before continuing with a script. Timing of responses or queries during a conversion, intonation, understanding of call context and content, and other indicia may be used to distinguish a computer-generated caller from a human caller.

Similar speech and call analysis may be performed in an ongoing call. For example, the call agent 108 may monitor an ongoing conversation and identify keywords, context, calling number, caller's speaking accent, or other aspects of the conversation. If the call agent 108 determines that the call is likely a scam, the call agent 108 may trigger a notification to the user. The notification may be provided on the compute device 102 or with an auxiliary device (e.g., a wearable device being worn by the user). The notification may be of any type of alert including, but not limited to an audible alert, a vibration, a non-audible alert, a flashing screen or light, an electric shock, a message, etc.

Figure 2:
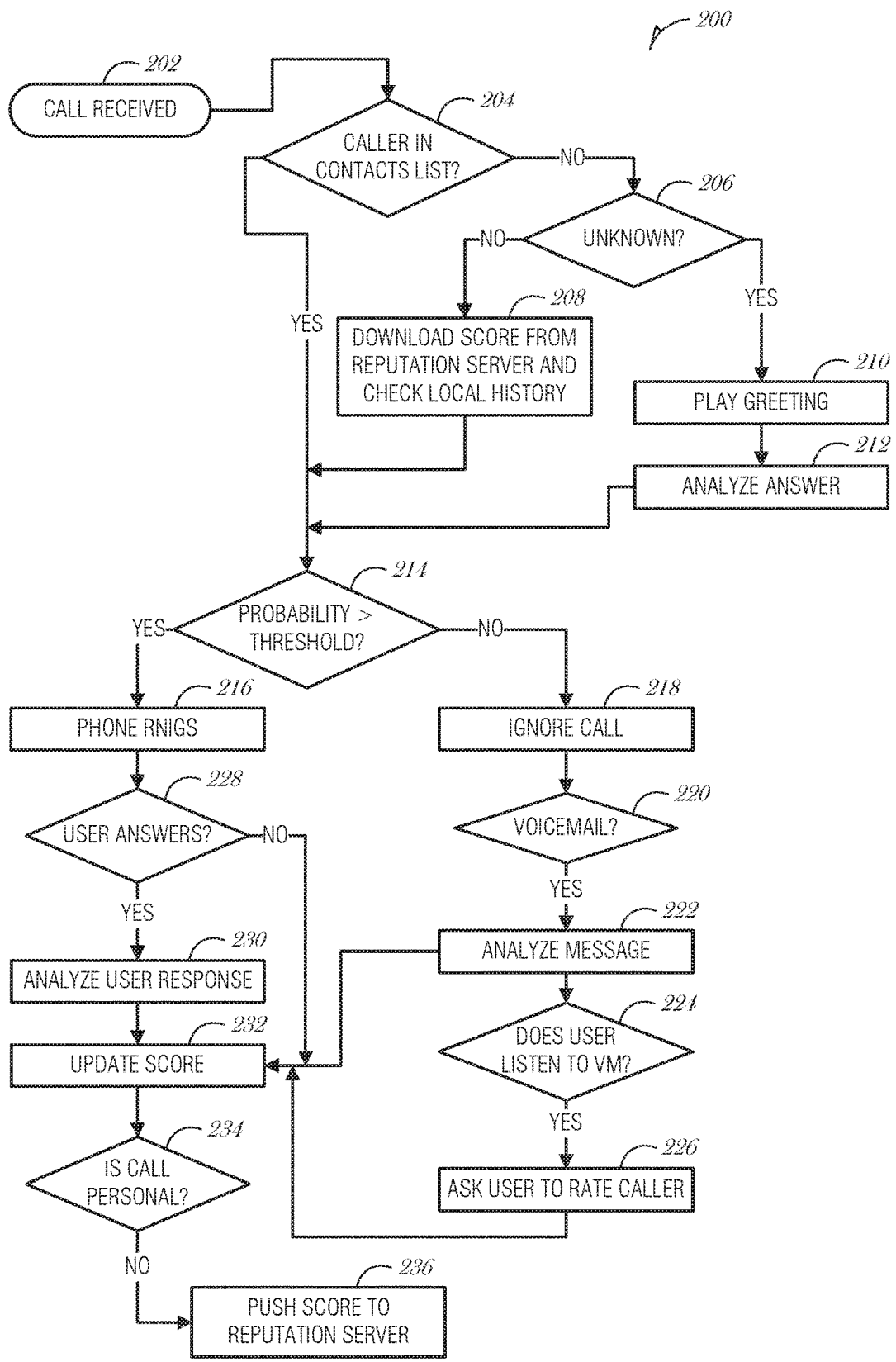
FIG. 2 is a block diagram illustrating control flow, according to an embodiment.

FIG. 2 is a block diagram illustrating control flow 200, according to an embodiment. At stage 202, a call is received at a compute device 102. The call may be a regular phone call, a voice over Internet Protocol (VOIP) call, etc. A call agent installed on the compute device 102 determine whether the caller identification exists in a contact list or has a history with the user of the compute device 102 (operation 204). If the caller is not in the contact list, then the call agent communicates with the reputation server to determine whether the calling phone number is unknown (operation 206). While some phone numbers may be unknown by the reputation server, it may be more likely that the calls have caller ID blocked, in which case there is not a phone number to look up. If the calling number is not blocked and known by the reputation server, then the reputation score is downloaded to the compute device 102 (operation 208). Alternately, if the phone number is unknown, then the compute device 102 may screen the call by playing a greeting (operation 210) and analyzing the answer to the greeting (operation 212).

At decision block 214, the call agent computes a probabilistic score to determine whether the incoming call is likely desirable. For example, when the caller is known, the call agent may determine the score based on the features of the caller (e.g., name, relationship to user based on social networks, email, text, behavior, history of frequency of previous communications, current user context including location, time, day, etc.) a probabilistic score. When the caller is unknown, then the score may be based on the score from the reputation server or analysis of an answer to a screening greeting. Based on the result, the call agent will either let the call through and the phone ring (operation 216) or ignore the call (operation 218).

If the call is ignored (operation 218), then it is determined whether the caller left a voicemail message (decision block 220). If there was a voicemail left, then it is analyzed (operation 222). Keywords or phrases may be identified in the voicemail to determine whether the call was interesting. The keywords, phrases, or other analysis of the voicemail may affect the determination of a score (operation 232). The keywords or phrases may also be pushed to the cloud (e.g., reputation server) to be used as tags or other metadata on phone numbers in the reputation database. If the user listens to the voicemail (decision block 224), then the user may be asked to rate the caller (operation 226). The rating may be used in combination with other factors to determine the score (operation 232).

Turning to the other decision path, if the probabilistic score is greater than a threshold (decision block 214), then the phone is rung (operation 216). If the user answers (decision block 228), then the call agent may analyze the user response (operation 230). Natural language processing or other speech recognition may be used to monitor the conversation and determine whether the phone number's reputation should be affected. The user may also be warned of the content or likelihood of it being a scam call. For example, in the case of detecting a criminal who is soliciting personal information, the system may be configured to understand content of the call and warn a user via any available mechanism that the call may be malicious (e.g., by buzzing a wearable device). If the user does not answer the phone, then the flow 200 moves to operation 232 where the score is updated. The score may be updated based on various inputs including the user's response (e.g., answer phone, hit ignore, listens to voicemail, texts the caller in response, etc.), the context or content of the conversation, the context or content of the voicemail, the rating providing be the user, etc.

If the call is not personal (decision block 234), then the score may be pushed to the reputation server (operation 236). This part is important as it allows for crowd-sourcing of the data. As a result, malicious, obnoxious, or irritating callers may be identified faster.

At the reputation server, the scores are compiled to produce a profile for the phone number. The profile may include a score and metadata. The metadata may include keywords, specific feedback from users, a business name, a business type, voice characteristics, or other information to assist in identifying a caller and/or evaluating the reputation of the phone number. The profile may have an aging mechanism, such that as a phone number ages, its reputation score increases. In this way, a phone number with a poor reputation that has not been used for several months or years, may eventually return to a neutral reputation score. The profile may be accessible by the owner of the phone number. The owner may use it for their own information or audit purposes. For example, a car dealership may regularly remind customers to make routine repair appointments. The car dealership's phone number may gain a negative reputation over time as people hang up on such reminder calls. The car dealership may be interested in knowing about their reputation in order to improve their business practices.

Metadata may also be used by users of the reputation server. For example, phone numbers may be filtered (either whitelisted or blacklisted) based on the metadata. A person who receives a call from a bank and ignores it may later provide feedback on the voicemail left, indicating that the voicemail included the terms "credit card." As a result, when a different user who regularly rejects calls from credit card companies receives a call from the bank, the call agent on the different user's phone may associate the "credit card" metadata tag with the phone number and determine that the different user likely does not want to take the phone call from the bank.

Figure 3:
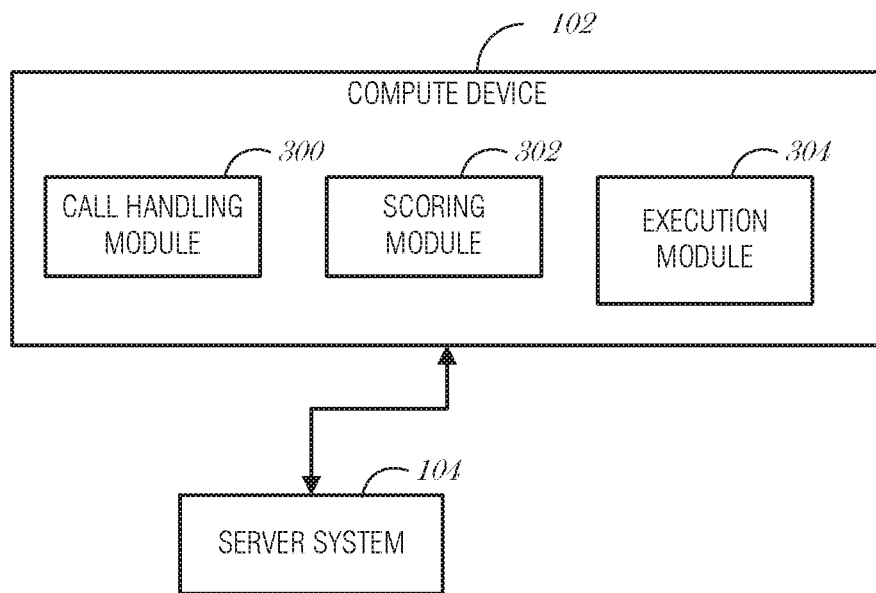
FIG. 3 is a block diagram illustrating a compute device and a server system for implementing a collaborative phone reputation system, according to an embodiment.

FIG. 3 is a block diagram illustrating a compute device 102 and a server system 104 for implementing a collaborative phone reputation system, according to an embodiment. The compute device 102 may include a call handling module 300, a scoring module 302, and an execution module 304.

The call handling module 300 may be configured to detect, at the compute device, an incoming call for a user of the compute device 102.

The scoring module 302 may be configured to determine a local probabilistic score that the incoming call is desirable for the user.

The execution module 304 may be configured to perform an action at the compute device 102 based on the local probabilistic score.

In an embodiment, to determine the local probabilistic score, the scoring module 302 is to determine that the incoming call is from a party in a contact list of the user and increase the local probabilistic score based on the determination that the incoming call is from the party in the contact list. In a further embodiment, the scoring module 302 is to increase the local probabilistic score based on a frequency of calls from the party, a modality of calls from the party, or quality of contact of calls from the party.

In a further embodiment, to perform the action, the execution module 304 is to notify the user of the incoming call. In a further embodiment, the scoring module 302 is to analyze a user response to the notifying the user of the incoming call and modify the local probabilistic score based on the user response.

In an embodiment, to determine the local probabilistic score, the scoring module 302 is to determine that the incoming call is from a party not in a contact list of the user and decrease the local probabilistic score based on the determination that the incoming call is from the party not in the contact list. In a further embodiment, the incoming call includes an originating phone number, and the scoring module 302 is to obtain a reputation score of the originating phone number and modify the local probabilistic score based on the reputation score. In a further embodiment, to obtain the reputation score, the scoring module 302 is to obtain the reputation score from a reputation server.

In another embodiment, the incoming call is anonymized, and the call handling module 300 is to screen the incoming call. In such an embodiment, the scoring module 302 is to modify the local probabilistic score based on the screening. In a further embodiment, to screen the incoming call, the call handling module 300 is to play a pre-arranged greeting and analyze the response to the pre-arranged greeting.

In an embodiment, the local probabilistic score is less than a threshold, and to perform the action at the compute device 102 based on the local probabilistic score, the execution module 304 is to send the incoming call to voicemail to leave a voicemail message. In a further embodiment, the scoring module 302 is to analyze the voicemail message and modify the local probabilistic score based on the analysis of the voicemail message.

In another embodiment, the scoring module 302 is to analyze a user response to the voicemail message and modify the local probabilistic score based on the user response. In a further embodiment, the scoring module 302 is to query the user for feedback on the incoming call, after the user has listened to the voicemail message and modify the local probabilistic score based on the feedback.

In an embodiment, the execution module 304 is to transmit the local probabilistic score to a reputation server. In this way, the local probabilistic score may be used as crowd-sourced information about the phone number.

In an embodiment, the server system 104 is communicatively coupled to the compute device 102 and the server system 104 may be configured to manage, in a reputation database, a plurality of reputation scores for a corresponding plurality of phone numbers. The server system 104 may further be configured to receive a request from the compute device 102 for a reputation score of a particular phone number and transmit the reputation score of the particular phone number to the compute device 102.

In an embodiment, to manage the plurality of reputation scores, the server system 104 is to receive local probabilistic scores from a plurality of compute devices for the particular phone number, calculate a reputation score for the particular phone number, and revise the reputation score for the particular phone number in the reputation database.

In an embodiment, to manage the plurality of reputation scores, the server system 104 is to track usage of a phone number and increase the reputation of the phone number based on the usage. For example, if over time the phone number is not used, the reputation may be increased. As another example, if over time the score received from users indicate that the phone number is being used responsibly, then the phone number's reputation may be increased to reflect this.

Various modules (e.g., modules 300 and 302) may be incorporated or integrated into an application that executes on the compute device 102. The application may execute in the background and collect data from the sensors and populate a database, which may be accessed by one or more other applications. Multiple applications may be developed to use the real-time or historical data for various purposes.

Figure 4:
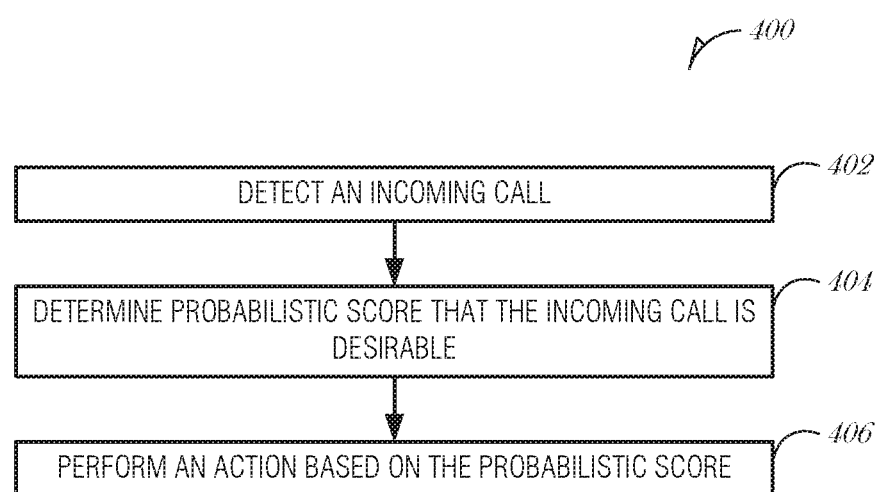
FIG. 4 is a flowchart illustrating a method of implementing a collaborative phone reputation system, according to an embodiment.

FIG. 4 is a flowchart illustrating a method 400 of implementing a collaborative phone reputation system, according to an embodiment. At block 402, an incoming call is detected at a compute device for a user of the compute device.

At block 404, a local probabilistic score that the incoming call is desirable for the user is determined.

At block 406, an action is performed at the compute device based on the local probabilistic score.

In an embodiment, determining the local probabilistic score comprises determining that the incoming call is from a party in a contact list of the user and increasing the local probabilistic score based on the determination that the incoming call is from the party in the contact list. In a further embodiment, the method 400 includes increasing the local probabilistic score based on a frequency of calls from the party, a modality of calls from the party, or quality of contact of calls from the party.

In a further embodiment, performing the action comprises notifying the user of the incoming call. In a further embodiment, the method 400 includes analyzing a user response to the notifying the user of the incoming call and modifying the local probabilistic score based on the user response.

In an embodiment, determining the local probabilistic score comprises: determining that the incoming call is from a party not in a contact list of the user and decreasing the local probabilistic score based on the determination that the incoming call is from the party not in the contact list. In a further embodiment, the incoming call includes an originating phone number, and the method 400 includes obtaining a reputation score of the originating phone number and modifying the local probabilistic score based on the reputation score. In a further embodiment, obtaining the reputation score comprises obtaining the reputation score from a reputation server.

In an embodiment, the incoming call is anonymized, and the method 400 includes screening the incoming call and modifying the local probabilistic score based on the screening. In a further embodiment, screening the incoming call comprises playing a pre-arranged greeting and analyzing the response to the pre-arranged greeting. In a further embodiment, the local probabilistic score is less than a threshold, and performing the action at the compute device based on the local probabilistic score comprises sending the incoming call to voicemail to leave a voicemail message. In a further embodiment, the method 400 includes analyzing the voicemail message and modifying the local probabilistic score based on the analysis of the voicemail message.

In an embodiment, the method 400 includes analyzing a user response to the voicemail message and modifying the local probabilistic score based on the user response. In a further embodiment, the method 400 includes querying the user for feedback on the incoming call, after the user has listened to the voicemail message and modifying the local probabilistic score based on the feedback.

In an embodiment, the method 400 includes transmitting the local probabilistic score to a reputation server.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
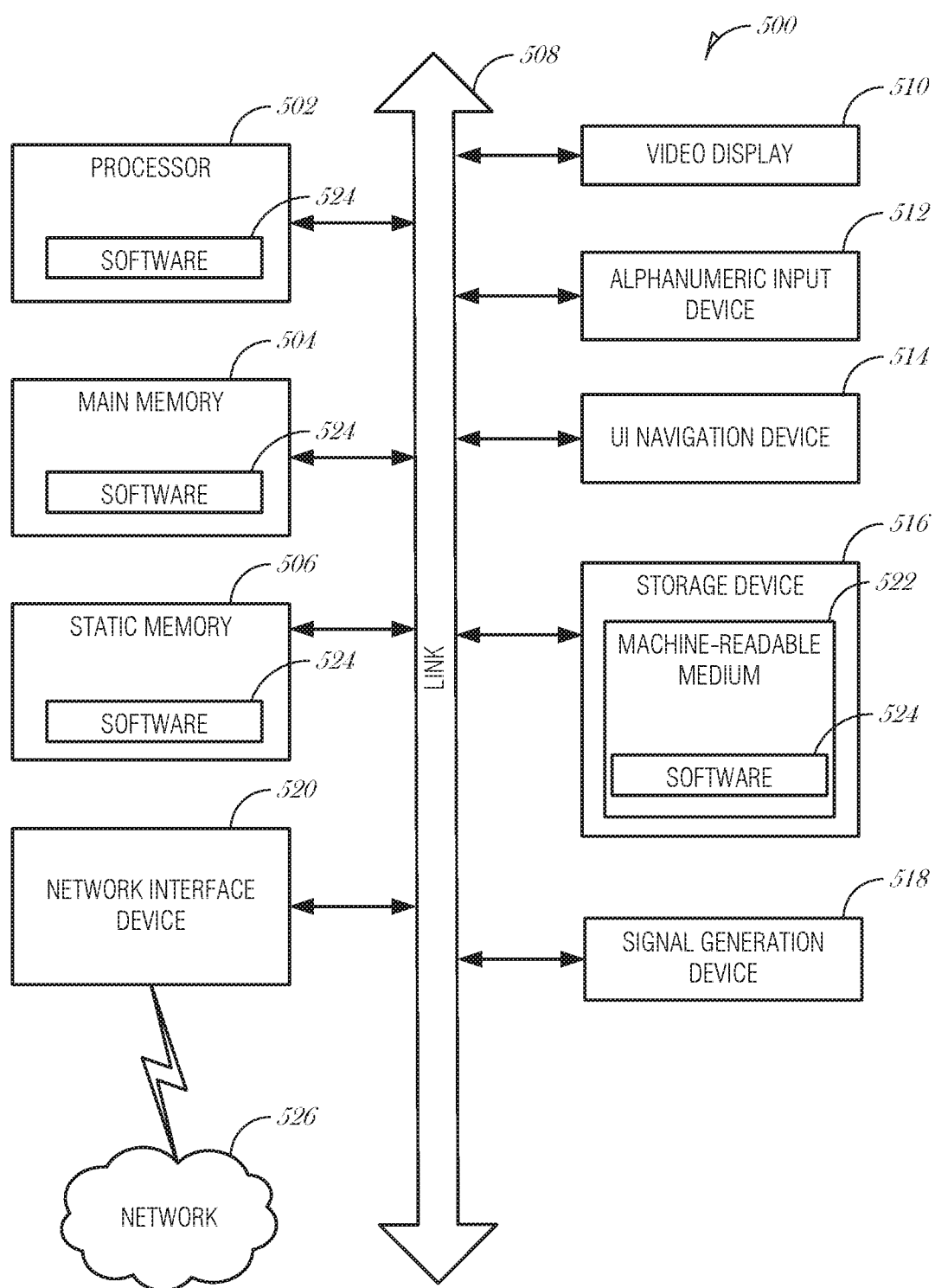
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) for implementing a collaborative phone reputation system comprising: a compute device comprising: a call handling module to detect, at the compute device, an incoming call for a user of the compute device; a scoring module to determine a local probabilistic score that the incoming call is desirable for the user; and an execution module to perform an action at the compute device based on the local probabilistic score.

In Example 2, the subject matter of Example 1 may include, wherein to determine the local probabilistic score, the scoring module is to: determine that the incoming call is from a party in a contact list of the user; and increase the local probabilistic score based on the determination that the incoming call is from the party in the contact list.

In Example 3, the subject matter of any one of Examples 1 to 2 may include, wherein the scoring module is to increase the local probabilistic score based on a frequency of calls from the party, a modality of calls from the party, or quality of contact of calls from the party.

In Example 4, the subject matter of any one of Examples 1 to 3 may include, wherein to perform the action, the execution module is to notify the user of the incoming call.

In Example 5, the subject matter of any one of Examples 1 to 4 may include, wherein the scoring module is to: analyze a user response to the notifying the user of the incoming call; and modify the local probabilistic score based on the user response.

In Example 6, the subject matter of any one of Examples 1 to 5 may include, wherein to determine the local probabilistic score, the scoring module is to: determine that the incoming call is from a party not in a contact list of the user; and decrease the local probabilistic score based on the determination that the incoming call is from the party not in the contact list.

In Example 7, the subject matter of any one of Examples 1 to 6 may include, wherein the incoming call includes an originating phone number, and wherein the scoring module is to: obtain a reputation score of the originating phone number; and modify the local probabilistic score based on the reputation score.

In Example 8, the subject matter of any one of Examples 1 to 7 may include, wherein to obtain the reputation score, the scoring module is to obtain the reputation score from a reputation server.

In Example 9, the subject matter of any one of Examples 1 to 8 may include, wherein the incoming call is anonymized, and wherein the call handling module is to screen the incoming call; and wherein the scoring module is to modify the local probabilistic score based on the screening.

In Example 10, the subject matter of any one of Examples 1 to 9 may include, wherein to screen the incoming call, the call handling module is to: play a pre-arranged greeting; and analyze the response to the pre-arranged greeting.

In Example 11, the subject matter of any one of Examples 1 to 10 may include, wherein the local probabilistic score is less than a threshold, and wherein to perform the action at the compute device based on the local probabilistic score, the execution module is to send the incoming call to voicemail to leave a voicemail message.

In Example 12, the subject matter of any one of Examples 1 to 11 may include, wherein the scoring module is to: analyze the voicemail message; and modify the local probabilistic score based on the analysis of the voicemail message.

In Example 13, the subject matter of any one of Examples 1 to 12 may include, wherein the scoring module is to: analyze a user response to the voicemail message; and modify the local probabilistic score based on the user response.

In Example 14, the subject matter of any one of Examples 1 to 13 may include, wherein the scoring module is to query the user for feedback on the incoming call, after the user has listened to the voicemail message; and modify the local probabilistic score based on the feedback.

In Example 15, the subject matter of any one of Examples 1 to 14 may include, wherein the execution module is to: transmit the local probabilistic score to a reputation server.

In Example 16, the subject matter of any one of Examples 1 to 15 may include, a server system communicatively coupled to the compute device, the server system to: manage, in a reputation database, a plurality of reputation scores for a corresponding plurality of phone numbers; receive a request from the compute device for a reputation score of a particular phone number; and transmit the reputation score of the particular phone number to the compute device.

In Example 17, the subject matter of any one of Examples 1 to 16 may include, wherein to manage the plurality of reputation scores, the server system is to: receive local probabilistic scores from a plurality of compute devices for the particular phone number; calculate a reputation score for the particular phone number; and revise the reputation score for the particular phone number in the reputation database.

In Example 18, the subject matter of any one of Examples 1 to 17 may include, wherein to manage the plurality of reputation scores, the server system is to: track usage of a phone number; and increase the reputation of the phone number based on the usage.

Example 19 includes subject matter (such as a method, means for performing acts, machine readable medium including instructions that when performed by a machine cause the machine to performs acts, or an apparatus to perform) for implementing a collaborative phone reputation system comprising: detecting, at a compute device, an incoming call for a user of the compute device; determining a local probabilistic score that the incoming call is desirable for the user; and performing an action at the compute device based on the local probabilistic score.

In Example 20, the subject matter of Example 19 may include, wherein determining the local probabilistic score comprises: determining that the incoming call is from a party in a contact list of the user; and increasing the local probabilistic score based on the determination that the incoming call is from the party in the contact list.

In Example 21, the subject matter of any one of Examples 19 to 20 may include, increasing the local probabilistic score based on a frequency of calls from the party, a modality of calls from the party, or quality of contact of calls from the party.

In Example 22, the subject matter of any one of Examples 19 to 21 may include, wherein performing the action comprises notifying the user of the incoming call.

In Example 23, the subject matter of any one of Examples 19 to 22 may include, analyzing a user response to the notifying the user of the incoming call; and modifying the local probabilistic score based on the user response.

In Example 24, the subject matter of any one of Examples 19 to 23 may include, wherein determining the local probabilistic score comprises: determining that the incoming call is from a party not in a contact list of the user; and decreasing the local probabilistic score based on the determination that the incoming call is from the party not in the contact list.

In Example 25, the subject matter of any one of Examples 19 to 24 may include, wherein the incoming call includes an originating phone number, and wherein the method further comprises: obtaining a reputation score of the originating phone number; and modifying the local probabilistic score based on the reputation score.

In Example 26, the subject matter of any one of Examples 19 to 25 may include, wherein obtaining the reputation score comprises obtaining the reputation score from a reputation server.

In Example 27, the subject matter of any one of Examples 19 to 26 may include, wherein the incoming call is anonymized, and wherein the method further comprises: screening the incoming call; and modifying the local probabilistic score based on the screening.

In Example 28, the subject matter of any one of Examples 19 to 27 may include, wherein screening the incoming call comprises: playing a pre-arranged greeting; and analyzing the response to the pre-arranged greeting.

In Example 29, the subject matter of any one of Examples 19 to 28 may include, wherein the local probabilistic score is less than a threshold, and wherein performing the action at the compute device based on the local probabilistic score comprises sending the incoming call to voicemail to leave a voicemail message.

In Example 30, the subject matter of any one of Examples 19 to 29 may include, analyzing the voicemail message; and modifying the local probabilistic score based on the analysis of the voicemail message.

In Example 31, the subject matter of any one of Examples 19 to 30 may include, analyzing a user response to the voicemail message; and modifying the local probabilistic score based on the user response.

In Example 32, the subject matter of any one of Examples 19 to 31 may include, querying the user for feedback on the incoming call, after the user has listened to the voicemail message; and modifying the local probabilistic score based on the feedback.

In Example 33, the subject matter of any one of Examples 19 to 32 may include, transmitting the local probabilistic score to a reputation server.

Example 34 includes at least one machine-readable medium including instructions, which when executed by a machine, cause the machine to perform operations of any of the Examples 19-33.

Example 35 includes an apparatus comprising means for performing any of the Examples 19-33.

Example 36 includes subject matter (such as a device, apparatus, or machine) for implementing a collaborative phone reputation system comprising: means for detecting, at a compute device, an incoming call for a user of the compute device; means for determining a local probabilistic score that the incoming call is desirable for the user; and means for performing an action at the compute device based on the local probabilistic score.

In Example 37, the subject matter of Example 36 may include, wherein the means for determining the local probabilistic score comprise: means for determining that the incoming call is from a party in a contact list of the user; and means for increasing the local probabilistic score based on the determination that the incoming call is from the party in the contact list.

In Example 38, the subject matter of any one of Examples 36 to 37 may include, means for increasing the local probabilistic score based on a frequency of calls from the party, a modality of calls from the party, or quality of contact of calls from the party.

In Example 39, the subject matter of any one of Examples 36 to 38 may include, wherein the means for performing the action comprise means for notifying the user of the incoming call.

In Example 40, the subject matter of any one of Examples 36 to 39 may include, means for analyzing a user response to the notifying the user of the incoming call; and means for modifying the local probabilistic score based on the user response.

In Example 41, the subject matter of any one of Examples 36 to 40 may include, wherein the means for determining the local probabilistic score comprise: means for determining that the incoming call is from a party not in a contact list of the user; and means for decreasing the local probabilistic score based on the determination that the incoming call is from the party not in the contact list.

In Example 42, the subject matter of any one of Examples 36 to 41 may include, wherein the incoming call includes an originating phone number, and wherein the apparatus further comprises: means for obtaining a reputation score of the originating phone number; and means for modifying the local probabilistic score based on the reputation score.

In Example 43, the subject matter of any one of Examples 36 to 42 may include, wherein the means for obtaining the reputation score comprise means for obtaining the reputation score from a reputation server.

In Example 44, the subject matter of any one of Examples 36 to 43 may include, wherein the incoming call is anonymized, and wherein the apparatus further comprises: means for screening the incoming call; and means for modifying the local probabilistic score based on the screening.

In Example 45, the subject matter of any one of Examples 36 to 44 may include, wherein the means for screening the incoming call comprises: means for playing a pre-arranged greeting; and means for analyzing the response to the pre-arranged greeting.

In Example 46, the subject matter of any one of Examples 36 to 45 may include, wherein the local probabilistic score is less than a threshold, and wherein the means for performing the action at the compute device based on the local probabilistic score comprise means for sending the incoming call to voicemail to leave a voicemail message.

In Example 47, the subject matter of any one of Examples 36 to 46 may include, means for analyzing the voicemail message; and means for modifying the local probabilistic score based on the analysis of the voicemail message.

In Example 48, the subject matter of any one of Examples 36 to 47 may include, means for analyzing a user response to the voicemail message; and means for modifying the local probabilistic score based on the user response.

In Example 49, the subject matter of any one of Examples 36 to 48 may include, means for querying the user for feedback on the incoming call, after the user has listened to the voicemail message; and means for modifying the local probabilistic score based on the feedback.

In Example 50, the subject matter of any one of Examples 36 to 49 may include, means for transmitting the local probabilistic score to a reputation server.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A mobile computing device configured for wirelessly communicating, when the mobile computing device is in operation, with a server system via an Internet network, the server system being for maintaining data related to a communication to be received by the mobile computing device, the mobile computing device comprising:
   a touch screen display;
   at least one camera;
   at least one accelerometer;
   at least one central processing unit that includes multiple cores;
   a wireless network interface circuit;
   semiconductor memory that includes flash memory, the semiconductor memory to store, when the mobile computing device is in the operation, contact data and client application instructions, the client application instructions being executable by the at least one central processing unit, the client application instructions, when executed by the at least one central processing unit resulting in the mobile computing device being configured for performance of operations comprising:
      display, via the display, a touch screen-based user interface for displaying at least one visual notification to a user of the mobile computing device of the communication received by the mobile computing device;
      analyze the communication, at least in part, to determine at least one feature of the communication;
      determine, based at least in part upon the at least one feature, to display, via the display, at least one other visual notification to the user, the at least one other visual notification being to notify the user that the communication is suspected to be undesirable to the user;
      receive, via the touch screen-based user interface, user input associated, at least in part, with at least one indication of user desirability of the communication; and
      generate and send other data, based at least in part upon the user input, to the server system for use in determination of desirability of the communication to be received by the mobile computing device;
   wherein:
      the contact data comprises an identification and a telephone number of originator of the communication.

2. The mobile computing device of claim 1, wherein:
   the operations further comprise providing, via the display, at least one additional notification to the user that an incoming text message is a suspected scam text message.

3. The mobile computing device of claim 1, wherein:
   when the mobile computing device is in the operation, the mobile computing device is to provide at least one vibration alert to indicate, at least in part, an incoming call to the user; and
   when the mobile computing device is in the operation, the mobile computing device is configured to:
      indicate to the user that the incoming call is suspected to be undesirable to the user; and
      obtain, via at least one sensor, biometric-related data.

4. The mobile computing device of claim 1, wherein:
   the wireless network interface circuit is for use in Wi-Fi network communication.

5. The mobile computing device of claim 1, wherein:
   the wireless network interface circuit is for use in LTE network communication.

6. A method implemented, at least in part, via a mobile computing device, the mobile computing device being configured for wirelessly communicating, when the mobile computing device is in operation, with a server system via an Internet network, the server system being for maintaining data related to a communication to be received by the mobile computing device, the mobile computing device comprising a touch screen display, at least one camera, at least one accelerometer, at least one central processing unit that includes multiple cores, a wireless network interface circuit, and semiconductor memory that includes flash memory, the method comprising:
   executing, by the at least one central processing unit, client application instructions stored in the semiconductor memory, the semiconductor memory also to store, when the mobile computing device is in the operation, contact data, the executing of the client application instructions by the at least one central processing unit resulting in the mobile computing device being configured for performance of operations comprising:

display, via the display, a touch screen-based user interface for displaying at least one visual notification to a user of the mobile computing device of the communication received by the mobile computing device;

analyze the communication, at least in part, to determine at least one feature of the communication;

determine, based at least in part upon the at least one feature, to display, via the display, at least one other visual notification to the user, the at least one other visual notification being to notify the user that the communication is suspected to be undesirable to the user;

receive, via the touch screen-based user interface, user input associated, at least in part, with at least one indication of user desirability of the communication; and generate and send other data, based at least in part upon the user input, to the server system for use in determination of desirability of the communication to be received by the mobile computing device;

wherein:
the contact data comprises an identification and a telephone number of originator of the communication.

7. The method of claim 6, wherein:
the operations further comprise providing, via the display, at least one additional notification to the user that an incoming text message is a suspected scam text message.

8. The method of claim 6, wherein:
when the mobile computing device is in the operation, the mobile computing device is to provide at least one vibration alert to indicate, at least in part, an incoming call to the user; and when the mobile computing device is in the operation, the mobile computing device is configured to:
indicate to the user that the incoming call is suspected to be undesirable to the user; and
obtain, via at least one sensor, biometric-related data.

9. The method of claim 6, wherein:
the wireless network interface circuit is for use in Wi-Fi network communication.

10. The method of claim 6, wherein:
the wireless network interface circuit is for use in LTE network communication.

11. At least one non-transitory computer-readable memory storing client application instructions that are executable by at least one central processing unit of a mobile computing device, the at least one central processing unit including multiple cores, the mobile computing device being configured for wirelessly communicating, when the mobile computing device is in operation, with a server system via an Internet network, the server system being for maintaining data related to a communication to be received by the mobile computing device, the mobile computing device comprising a touch screen display, at least one camera, at least one accelerometer, a wireless network interface circuit, and semiconductor memory that includes flash memory, the instructions when executed by the at least one central processing unit resulting in the mobile computing device being configured to perform operations comprising:

display, via the display, a touch screen-based user interface for displaying at least one visual notification to a user of the mobile computing device of the communication received by the mobile computing device;

analyze the communication, at least in part, to determine at least one feature of the communication;

determine, based at least in part upon the at least one feature, to display, via the display, at least one other visual notification to the user, the at least one other visual notification being to notify the user that the communication is suspected to be undesirable to the user;

receive, via the touch screen-based user interface, user input associated, at least in part, with at least one indication of user desirability of the communication; and generate and send other data, based at least in part upon the user input, to the server system for use in determination of desirability of the communication to be received by the mobile computing device;

wherein:
the semiconductor memory is also to store contact data; and
the contact data comprises an identification and a telephone number of originator of the communication.

12. The at least one non-transitory computer-readable memory of claim 11, wherein:
the operations further comprise providing, via the display, at least one additional notification to the user that an incoming text message is a suspected scam text message.

13. The at least one non-transitory computer-readable memory of claim 11, wherein:
when the mobile computing device is in the operation, the mobile computing device is to provide at least one vibration alert to indicate, at least in part, an incoming call to the user; and when the mobile computing device is in the operation, the mobile computing device is configured to:
indicate to the user that the incoming call is suspected to be undesirable to the user; and
obtain, via at least one sensor, biometric-related data.

14. The at least one non-transitory computer-readable memory of claim 11, wherein:
the wireless network interface circuit is for use in Wi-Fi network communication.

15. The at least one non-transitory computer-readable memory of claim 11, wherein:
the wireless network interface circuit is for use in LTE network communication.

16. A mobile computing device configured for wirelessly communicating, when the mobile computing device is in operation, with a server system via an Internet network, the server system being for maintaining data related to a communication to be received by the mobile computing device, the mobile computing device comprising:
a touch screen display means;
camera means;
accelerometer means;
processor means;
wireless network interface means;
memory for storing, when the mobile computing device is in the operation, contact data and client application instructions, the client application instructions being executable by the at least one central processing unit, the client application instructions, when executed by the processor means resulting in the mobile computing device being configured for performance of operations comprising:

display, via the touch screen display means, a touch screen-based user interface for displaying at least one visual notification to a user of the mobile computing device of the communication received by the mobile computing device;

analyze the communication, at least in part, to determine at least one feature of the communication;

determine, based at least in part upon the at least one feature, to display, via the display, at least one other visual notification to the user, the at least one other visual notification being to notify the user that the communication is suspected to be undesirable to the user;

receive, via the touch screen-based user interface, user input associated, at least in part, with at least one indication of user desirability of the communication; and generate and send other data, based at least in part upon the user input, to the server system for use in determination of desirability of the communication to be received by the mobile computing device;

wherein:
the contact data comprises an identification and a telephone number of originator of the communication.

17. The mobile computing device of claim 16, wherein:
the operations further comprise providing, via the display, at least one additional notification to the user that an incoming text message is a suspected scam text message.

18. The mobile computing device of claim 16, wherein:
when the mobile computing device is in the operation, the mobile computing device is to provide at least one vibration alert to indicate, at least in part, an incoming call to the user; and
when the mobile computing device is in the operation, the mobile computing device is configured to:
indicate to the user that the incoming call is suspected to be undesirable to the user; and
obtain, via sensor means, biometric-related data.

19. The mobile computing device of claim 16, wherein:
the wireless network interface means is for use in Wi-Fi network communication.

20. The mobile computing device of claim 16, wherein:
the wireless network interface means is for use in LTE network communication.

* * * * *